United States Patent
Gavade et al.

(10) Patent No.: US 9,201,882 B2
(45) Date of Patent: Dec. 1, 2015

(54) PROVISIONING CONFIGURATION CHANGES TO A CONTENT PLAYER DEVICE

(75) Inventors: Sameer Vasant Gavade, Irving, TX (US); Venkata (Kiran) Adimatyam, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 629 days.

(21) Appl. No.: 12/542,073

(22) Filed: Aug. 17, 2009

(65) Prior Publication Data

US 2011/0040731 A1 Feb. 17, 2011

(51) Int. Cl.
| | |
|---|---|
| G06F 17/30 | (2006.01) |
| G06F 21/10 | (2013.01) |
| H04N 21/258 | (2011.01) |
| H04N 21/443 | (2011.01) |
| H04N 21/485 | (2011.01) |
| H04N 21/658 | (2011.01) |

(52) U.S. Cl.
CPC .......... *G06F 17/30053* (2013.01); *G06F 21/10* (2013.01); *H04N 21/25891* (2013.01); *H04N 21/4435* (2013.01); *H04N 21/485* (2013.01); *H04N 21/658* (2013.01)

(58) Field of Classification Search
CPC ................ G06F 17/30132; H04N 21/4435
USPC ............. 707/684, 999.009; 725/87; 713/183; 705/41
See application file for complete search history.

(56) References Cited

U.S. PATENT DOCUMENTS

| | | | | |
|---|---|---|---|---|
| 2002/0116589 | A1* | 8/2002 | Gold ............................. | 711/163 |
| 2002/0152181 | A1* | 10/2002 | Kanai et al. .................... | 705/80 |
| 2003/0026424 | A1* | 2/2003 | McGarrahan et al. ........ | 380/255 |
| 2003/0135580 | A1* | 7/2003 | Camble et al. ................ | 709/216 |
| 2004/0098752 | A1* | 5/2004 | Bruynsteen ................... | 725/132 |
| 2005/0015603 | A1* | 1/2005 | Cabezas et al. ............... | 713/183 |
| 2005/0102232 | A1* | 5/2005 | Okabayashi et al. .......... | 705/41 |
| 2006/0253451 | A1* | 11/2006 | Van De Sluis et al. .. | 707/999.01 |
| 2007/0261089 | A1* | 11/2007 | Aaby et al. .................... | 725/100 |
| 2008/0282191 | A1* | 11/2008 | Branam et al. ................ | 715/810 |
| 2009/0070883 | A1* | 3/2009 | Eyer ............................... | 726/26 |
| 2009/0100478 | A1* | 4/2009 | Craner et al. ................... | 725/87 |

OTHER PUBLICATIONS

Skital, "Service Level Agreement Metrics," EGEE SA1 Operations Workshop, Stockholm, Sweden, Jun. 15, 2007. Retrieved on Aug. 1, 2013 from http://indico.cern.ch/getFile.py/access?contribId=18&sessionId=4&resId=1&materialId=slides&confId=12807.*

* cited by examiner

*Primary Examiner* — Etienne LeRoux

(57) ABSTRACT

A device may include a network interface for communicating with another device over a network, a storage unit to store content, and a processor. The processor may be configured to receive a request from a user to change usable storage space on the storage unit, send a message that describes the request to a service provider, receive a reply allowing the user to change the usable storage space from the service provider, provide at least one option to the user in response to the reply, receive information from the user selecting a first one of the at least one option, and set a size of the usable storage space to a value corresponding to the first option.

20 Claims, 7 Drawing Sheets

PROVISIONING CONFIGURATION CHANGES TO A CONTENT PLAYER DEVICE

BACKGROUND

Current set-top boxes (STBs) may include components and/or features that are typically part of stand-alone devices. For example, a set-top box may include a digital video disk (DVD) player that provides high definition media interface (HDMI) output. In another example, the set-top box may include a hard disk drive to store televised programs, movies, and/or other types of digital content.

DETAILED DESCRIPTION

The following detailed description refers to the accompanying drawings. The same reference numbers in different drawings may identify the same or similar elements. As used herein, the phrase "content presentation device" may refer to any device that can receive multimedia content and generate audio/visual signals based on the multimedia content (e.g., a television, a pair of speakers and a display that are attached to a computer, etc.). As used herein, the phrase "content player device" may refer to any media processing system (e.g., a set-top box) that may receive multimedia content over a network and provide the multimedia content to a content presentation device. As used herein, the phrase "television program" may refer to any multimedia content that may be provided to a content player device.

As described herein, a system may provision a change in configuration of a content player device (e.g., a set-top box). When a user wishes to change the configuration of the content player device, the user may launch a device configuration application on the content player device. Via the device configuration application, the user may change the configuration of the content player device and notify a provisioning device of the change. In some implementations, the change may entail additional interaction between the content player device and the provisioning device.

Figure 1:
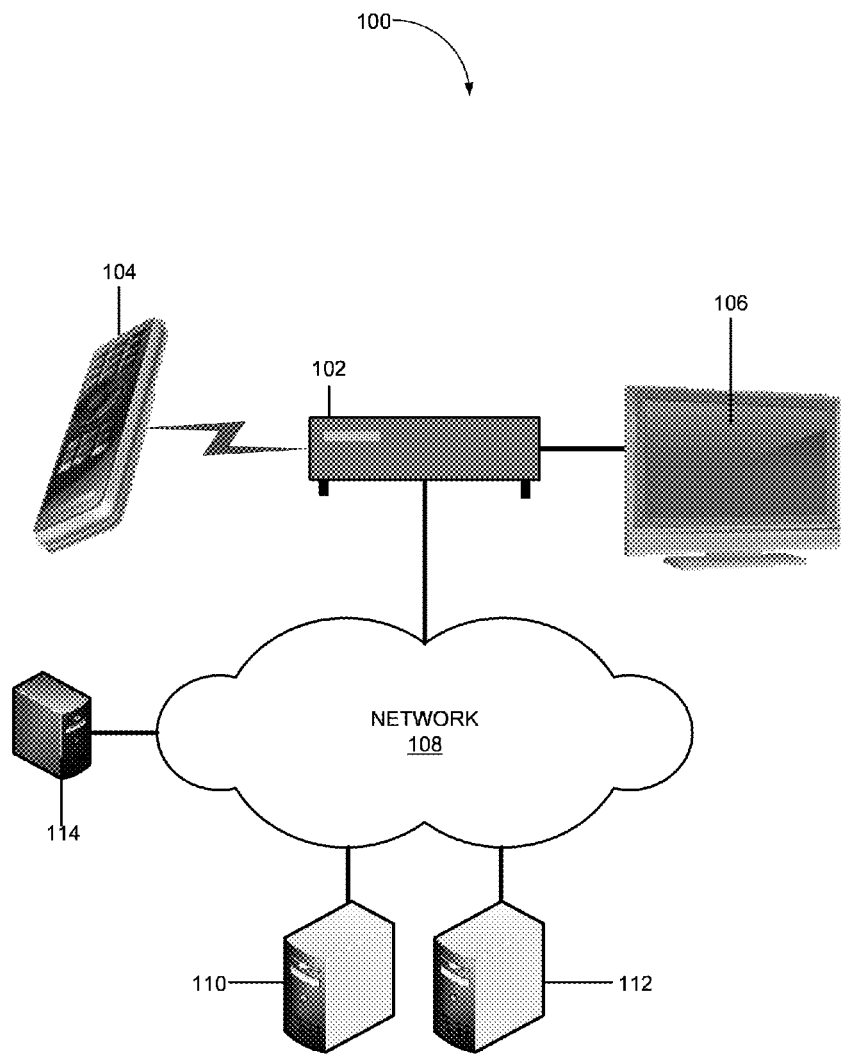
FIG. 1 shows a network in which concepts described herein may be implemented.

FIG. 1 is a block diagram of an exemplary network 100 in which concepts described herein may be implemented. As shown, network 100 may include a content player device 102 (e.g., a set-top box), remote control 104, content presentation device 106 (e.g., a television, stereo system, etc.), network 108, content server device 110, content storage device 112, and provisioning device 114.

Content player device 102 may receive commands from remote control 104, receive content over network 108, and/or play the content on content presentation device 106. In addition, content player device 102 may store content (e.g., movies, television programs, etc.) on, for example, its hard disk drive, and may allow a user to play the stored content.

In some implementations, an amount of content that the user may store on content player device 102, the processor speed, the amount of memory, and/or other configuration or performance characteristics of content player device 102 may be determined by a specific level of service that the user has secured with a service/content provider. As described in detail below, to modify the configuration, content player device 102 may interact with provisioning device 114 over network 108.

Examples of content player device 102 may include a set-top box or a component (e.g., a cable card) that plugs into a host device (e.g., a digital video recorder, a personal computer, a television, stereo system, etc.) and allows the host device to display multimedia content (e.g., content on digital cable television channels). Although content player device 102 can be implemented as different types of devices (e.g., a set-top-box, computer, digital video disk (DVD) player, cable card, etc.), in the following, content player device 102 is described in terms of a set-top box.

Remote control 104 may include a device for generating and transmitting wireless commands to control electronic devices (e.g., a television, set-top box, stereo system, DVD player, etc.). In different implementations, in place of remote control 104, other types of devices (e.g., a wireless keyboard, mouse, handheld device (e.g., cellular phone), etc.) may be used to control the electronic devices.

Content presentation device 106 may include a device for playing media signals and/or signals from content player device 102. Examples of content presentation device 106 may include a television, one or more speakers and a display, a portable digital assistant (PDA) or a cell phone capable of displaying a received video, etc. In the following paragraphs, content presentation device 106 is assumed to be a television for simplicity and ease of understanding.

Network 108 may include a fiber-optic network (e.g., passive optical networks (PONs)), an ad hoc network, a local area network (LAN), a wide area network (WAN), a wireless LAN, a metropolitan area network (MAN), a cellular network, a public switched telephone network (PSTN), an intranet, the Internet, a satellite-based network, any other network, or a combination of networks. Devices (e.g., content player device 102, content server device 110, etc.) that are shown in FIG. 1 may connect to network 108 via wireless, wired, or optical communication links. In addition, network 108 may allow any of devices 102-106 and 110-114 to communicate with any other device 102-106 and 110-114. In some embodiments, devices 102-106 and 110-114 may communicate with each other directly rather than through network 108.

Content server device 110 may include one or more devices for providing content and/or data. The content and/or data, and/or program may be sent to content player device 102 and/or content presentation device 106. For example, content server device 110 may provide video-on-demand (VOD), broadcast programs, etc., to content player device 102.

Content storage device 112 may include database of content (e.g., a movie, a piece of music, a video clip, etc.). Based on a user request, content server device 110 may retrieve a particular unit of content from content storage device 112 for delivery to a content player device 102.

Provisioning device 114 may include logic to receive a request to change a configuration of content player device 102, lookup or update one or more databases to determine whether the modification is authorized or to authorize the modification, inform other devices (not shown) of the modification, and communicate with content player device 102 to provision the configuration change (e.g., increase the processor speed, increase or decrease the limit on the usable disk space on content player device 102, etc.).

Depending on the implementation, network 100 may include additional, fewer, or different devices, or a different arrangement of the devices. For example, network 100 may include a content distribution system (e.g., a video/audio broadcast system), additional control devices, etc. Moreover, one or more devices of network 100 may perform one or more functions of another device of network 100. For example, content player device 102 and content presentation device 106 may be implemented as a single device. In another example, data or information stored on content storage device 112 may be stored on multiple devices.

Figure 2:
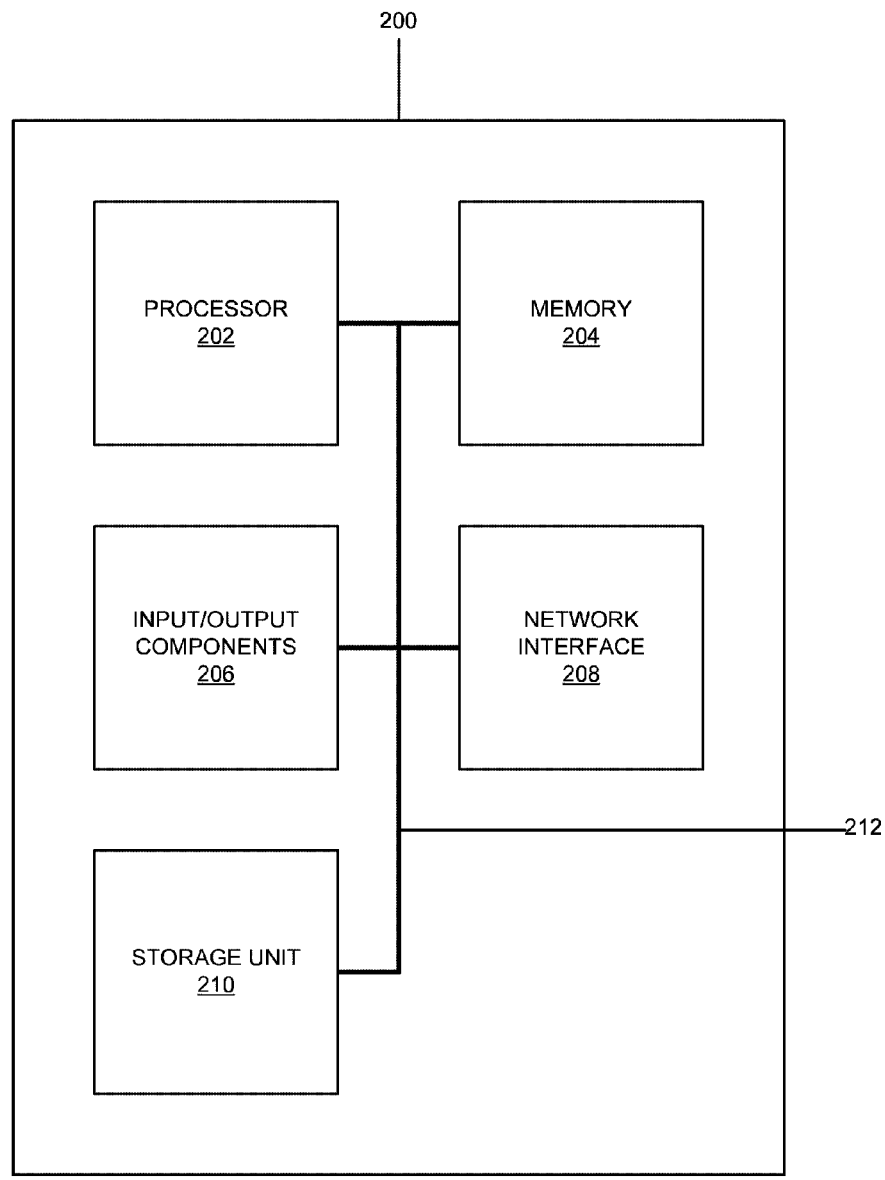
FIG. 2 is a block diagram of an exemplary network device of FIG. 1.

FIG. 2 is a block diagram of an exemplary network device 200, which may correspond to content player device 102, content presentation device 106, content server device 110, content storage device 112, and/or provisioning device 114. As shown, network device 200 may include a processor 202, a memory 204, input/output components 206, a network interface 208, a storage unit 210, and a communication path 212. In different implementations, network device 200 may include additional, fewer, or different components than the ones illustrated in FIG. 2. For example, network device 200 may include line interfaces, such as interfaces for receiving and forwarding data.

Processor 202 may include a processor, a microprocessor, an Application Specific Integrated Circuit (ASIC), a Field Programmable Gate Array (FPGA), and/or other processing logic capable of controlling network device 200. Memory 204 may include static memory, such as read only memory (ROM), and/or dynamic memory, such as random access memory (RAM), or onboard cache, for storing data and machine-readable instructions.

Input/output components 206 may include a display screen, a keyboard, a mouse, a speaker, a microphone, a DVD writer, a DVD reader, Universal Serial Bus (USB) lines, and/or other types of components for converting physical events or phenomena to and/or from digital signals that pertain to network device 200.

Network interface 208 may include any transceiver-like mechanism that enables network device 200 to communicate with other devices and/or systems. For example, network interface 208 may include mechanisms for communicating via a network, such as the Internet, a terrestrial wireless network (e.g., a WLAN), a satellite-based network, etc. Additionally or alternatively, network interface 208 may include a modem, an Ethernet interface to a LAN, and/or an interface/connection for connecting network device 200 to other devices (e.g., a Bluetooth interface).

Storage unit 210 may include storage devices, such as a hard disk, floppy disk, CD ROM, CD read/write (R/W) disc, and/or flash memory, as well as other types of storage devices. In some implementations, storage unit 210 may be used to store content. Communication path 212 may provide an interface through which components of network device 200 can communicate with one another.

Figure 3:
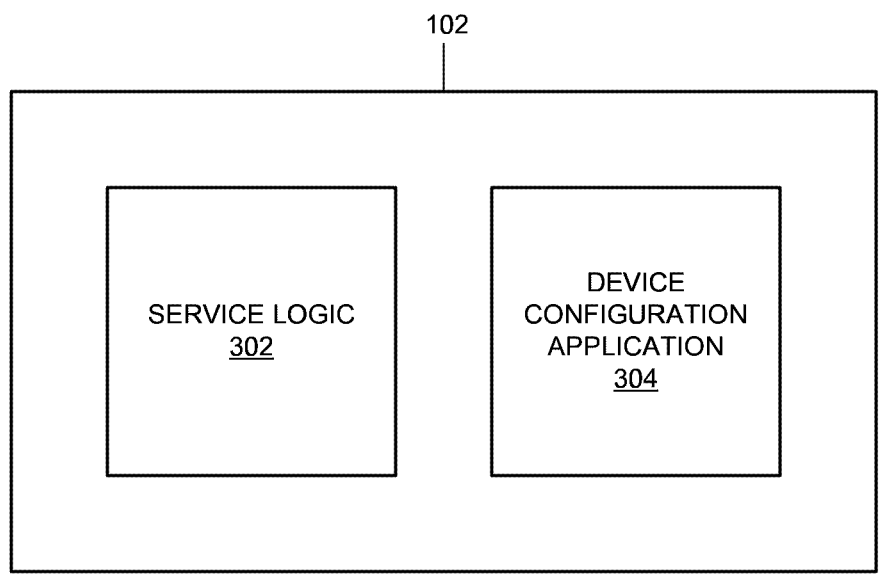
FIG. 3 is a functional block diagram of an exemplary content player device of FIG. 1.

FIG. 3 is a functional block diagram of content player device 102. As shown, content player device 102 may include service logic 302 and a device configuration application 304. Although not illustrated, content player device 102 may include additional components, such as components illustrated in network device 200, an operating system (e.g., Linux, Windows, etc.), a multimedia application, an email client application, etc.

Service logic 302 may include hardware and/or software for enforcing performance of content player device 102 in accordance with its configuration and a specific service or service agreement under which the user operates content player device 102. For example, service logic 302 may prevent content player device 102 from using more RAM to process video than an allotted amount in accordance with its configuration under the service agreement.

In another example, service logic 302 may cap the amount of storage space that content player device 102 uses to store content (e.g., movies). To cap the storage space, service logic 302 may execute when the user performs an operation, via remote control 104, at content player device 102 and causes content player device 102 to store or write content (e.g., a movie, television program, etc.) on storage unit 210.

In writing content to storage unit 210, service logic 302 may retrieve, from memory 204, an upper limit on the amount of storage space content player device 102 may use in accordance with its configuration. If the upper limit is greater than the amount of storage space that will be used as a result of storing the content, service logic 302 may write the content to storage unit 210. Otherwise, service logic 302 may cause content player device 102 to display an error message on content presentation device 106 (e.g., "You do not have sufficient storage space to store the selected program. You may be able to access additional storage space by upgrading your service level. If you wish to upgrade, please click on the UPGRADE button below.").

Device configuration application 304 may include software (e.g., a web browser, a stand-alone client application, etc.) for modifying the user's service and content player device 102's configuration in accordance with the modified service. The user may launch device configuration application 304 by, for example, navigating through menus on content player device 102 via remote control 104, and/or other graphical user interface (GUI) component for activating device configuration application 304.

Once device configuration application 304 is running, device configuration application 304 may interact with provisioning device 114 over network 108, receive a user's selection of a specific configuration change (e.g., an upgrade that increases the usable storage space from 20 gigabytes (Gb) to 100 Gb and send a request for the configuration change to provisioning device 114. Depending on a reply from provisioning device 114, device configuration application 304 may change the configuration of content player device 102.

Figure 4:
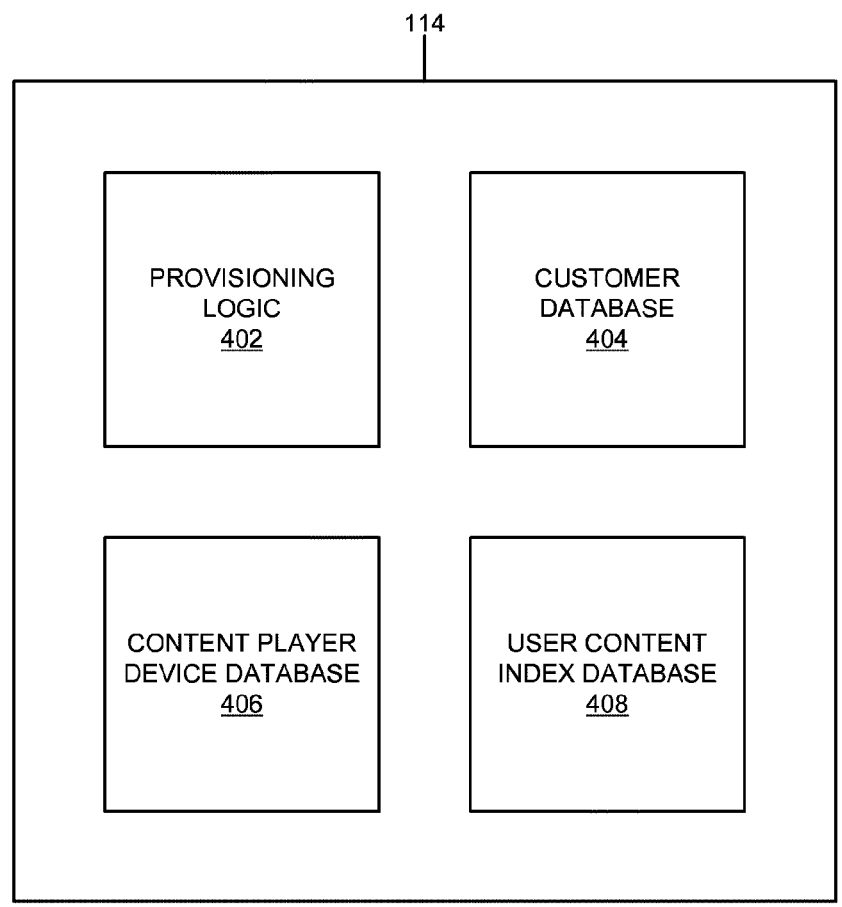
FIG. 4 is a functional block diagram of an exemplary provisioning device of FIG. 1.

FIG. 4 is a functional block diagram of provisioning device 114. As shown, provisioning device 114 may include provisioning logic 402, a customer database 404, a content player device database 406, and a user content index database 408. Depending on the implementation, provisioning device 114 may include additional, fewer, or different components in similar or different arrangements. In addition, depending on the implementation, the components of provisioning device 114 may be distributed over several physical network devices. For example, in one implementation, customer database 404, content player device database 406, and user content index database 408 may be hosted on different servers.

Provisioning logic 402 may interact with device configuration application 304 over network 108, and may provision different services or service levels for a user. Processes that are associated with provisioning logic 402 are described below in greater detail, with reference to FIG. 6. In provisioning the services/service levels, provisioning logic 402 may perform lookups in or update customer database 404 (e.g., to determine whether the user has the authority to change the service level and its associated device configuration), content player device database 406 (e.g., to determine a list of service levels/device configurations that a user may select, depending on hardware capabilities of content player device 102 that is requesting the configuration change), and/or user content index database 408 (e.g., to track a list of movies that are currently stored on content player device 102).

Customer database 404 may include information that is associated with a user's account or service agreement with a service provider. For example, customer database 404 may indicate whether a customer has authority to increase an upper limit on the amount of disk space that content player device 102 may use for storing content.

Content player device database 406 may include a description of one or more content player devices 102 that may be requesting configuration changes. For example, content player device database 406 may indicate a current upper limit on the amount of storage space that content player device 102 may use, types and number of processors that are active in content player device 102, the amount of RAM in content player device 102, a network interface that is installed on content player device 102, etc.

User content index 408 may include a list of content that is stored at content player device 102. The list may be used to initiate a rollback to a prior configuration, for example, when the user requests provisioning device 102 to restore a list identifying content (e.g., movies) that was stored on content player device 102 before a previous configuration change.

Figure 5:
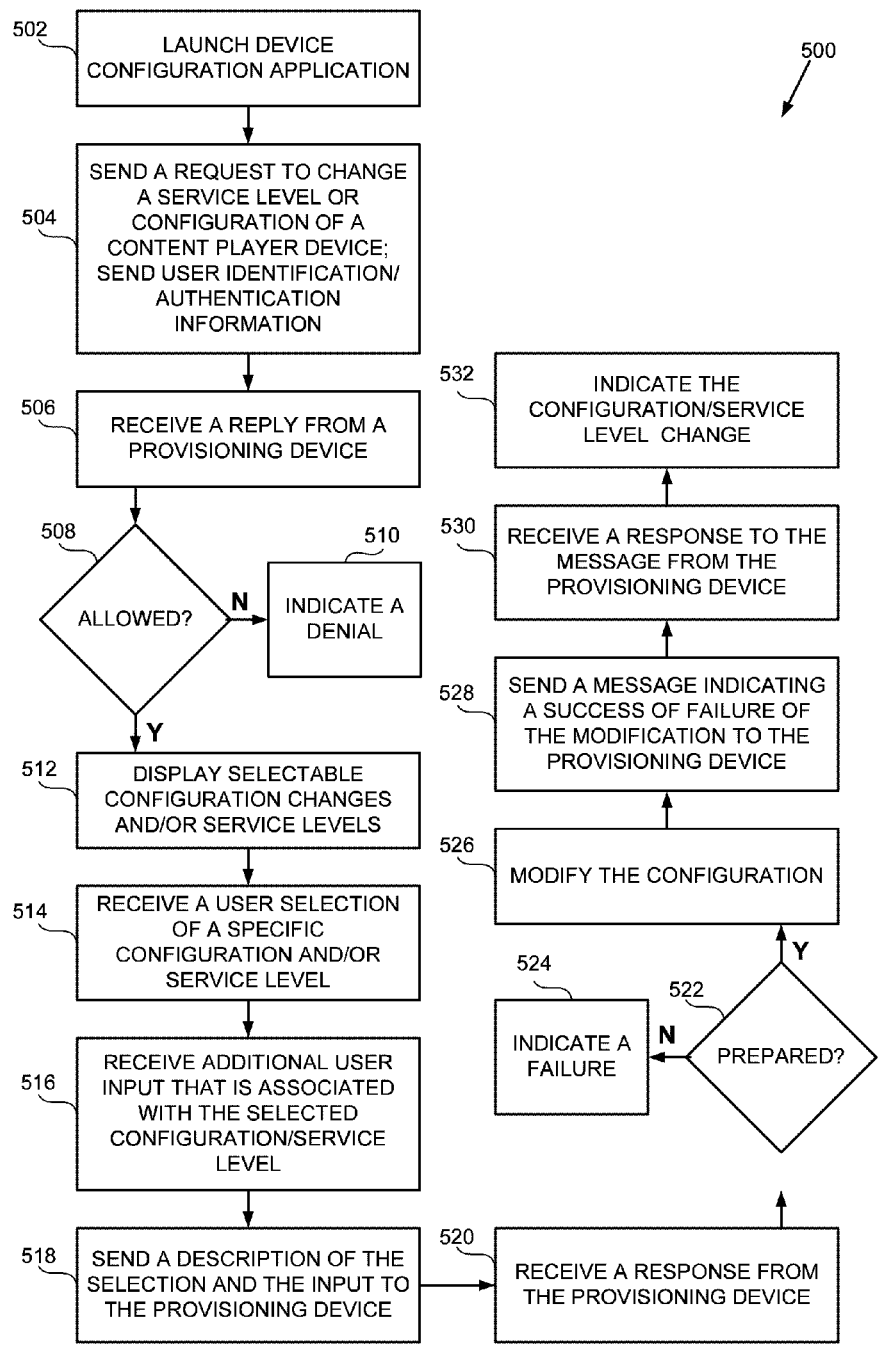
FIG. 5 is a flow diagram of an exemplary process that is associated with a device configuration application of the content player device of FIG. 3.

FIG. 5 is a flow diagram of an exemplary process 500 that is associated with device configuration application 304 of content player device 102. Process 500 may start with a user launching device configuration application 304 (block 502). The user may launch device configuration application 304 in different ways.

For example, assume that the user has attempted to store a movie and received a warning message from content player device 102, indicating that more storage space is needed to store the movie, along with a button or a link for launching device configuration application 304. In another example, assume that the user has tried to view two high definition movies via a picture-in-picture (PIP) feature and has received a warning from content player device 102 that more RAM needs to be allocated for improved performance, along with a link or a button for launching device configuration application 304 (e.g., a browser, a stand-alone GUI application, etc.). In each of the examples, the user may click on the button or activate the link (e.g., via a mouse, remote control 104, etc.) and launch device configuration application 304.

In a different implementation, the user may launch device configuration application 304 in response to one of intermittent prompts from content player device 102 to upgrade the configuration/service level. In some instances, content player device 102 may prompt the user after the user records a program that causes content player device 102 to temporarily allocate more storage space than the amount allowed for the user. If the user does not upgrade the configuration, content player device 102 may delete the recorded program.

Device configuration application 304 may send a request to change a service level or configuration of content player device 102 to provisioning device 114 (block 504). In addition, along with the request, device configuration application 304 may send user identification information and/or authentication information to provisioning device 114 (block 504). Based on the request and user identification/authentication information, provisioning device 304 may send a reply allowing and/or denying the modification to device configuration application 304. When provisioning device 114 allows the modification, provisioning device 114 may also send a list of configuration changes (e.g., a list of upgrades for increasing the storage space (e.g., 1 Gb, 2 Gb, 4 Gb, etc.)) that the user may select via device configuration application 304.

Device configuration application 304 may receive the reply from provisioning device 114 (block 506). If the reply prohibits the user from modifying the configuration or the service level (block 508—NO), device configuration application 304 may output a message via content presentation device 106, to indicate that the user is not authorized to perform the modification (block 510). If the reply allows the user to modify the configuration or the service level (block 508—YES), device configuration application 304 may display, via content presentation device 106, a selectable list of modifications (block 512). For example, device configuration application 304 may allow the user to select or upgrade to disk space in the amount of 1 Gb, 10 Gb, 20 Gb, etc.

In some implementations, selection of a service level may be automatic, depending on the selected configuration. For example, when the user selects 100 Gb, device configuration application 304 may also select "Gold" service level. In other implementations, the user may select one of many service levels that are displayed on a GUI window. In such implementations, each of the service levels may be associated with a specific set of hardware capabilities. For example, the "Gold" service level may be associated with 2 terabytes (Tb) of storage space, the processor speed of 4 Gigahertz (Gh), 8 Gb of RAM, etc.

Device configuration application 304 may receive the user selection of a specific configuration and/or service level (block 514). The user may select, for example, a configuration/service level in which the usable disk space is 100 Gb. Depending on the current configuration, the selection may result in an increase or decrease of usable storage space. In yet another example, the user may select another configuration/service level in which the speed of its processors is increased from 2.0 Gh to 3.0 Gh. Alternatively, the user may select a combination of different processor speeds, RAM, and/or hard disk space.

Device configuration application 304 may receive additional user input that is associated with the selected configuration/service level (block 516). In some implementations, depending on the user selection, the user may provide additional input to device configuration application 304. For example, assume that the user selects a configuration/service level in which the upper limit on hard disk space use is decreased, from the current value of 100 Gb to 50 Gb. In such a case, device configuration application 304 may allow the user to input a list of movies that the user wishes the decreased hard disk drive to include. The names of movies that are not input may be eliminated if the decreased disk space is insufficient to store all of the movies.

Device configuration application 304 may send a description of the selected configuration/service level and the input to provisioning device 114 (block 518), and subsequently, receive a response to the description from provisioning device 114 (block 520). If the response indicates the databases on provisioning device 114 are not properly updated or not ready to be updated, and, therefore, are not prepared for the configuration/service level change on content player device 102 (block 522—NO), device configuration application 304 may abort the current configuration change and indicate to the user that the attempt to modify the configuration/service level has failed (block 524).

If the response indicates that the databases on provisioning devices are prepared for the configuration/service level change (block 522—YES), device configuration application 304 may modify the configuration/service level of content player device 102 (block 526) (e.g., increase the upper limit on hard disk space use, increase the processor speed, RAM use, etc.).

In some instances, device configuration application 304 may be unable to modify the configuration/service level due to hardware problems, power failure, user interruptions, etc. Therefore, to inform provisioning device 114 whether the configuration/service level change is a success or failure, device configuration application 304 may send a message indicating a success or failure of the modification to provisioning device 114 (block 528).

Device configuration application 304 may receive a response from provisioning device 114 (block 530). The response may indicate that the databases in provisioning device 114 fully reflect the configuration/service level change, and therefore, content player device 102 is ready for use at the new configuration/service level.

Device configuration application 304 may indicate the configuration/service level change (block 532). For example, device configuration application 304 may output a message to convent presentation device 106, to indicate the user requested change has been completed.

Figure 6:
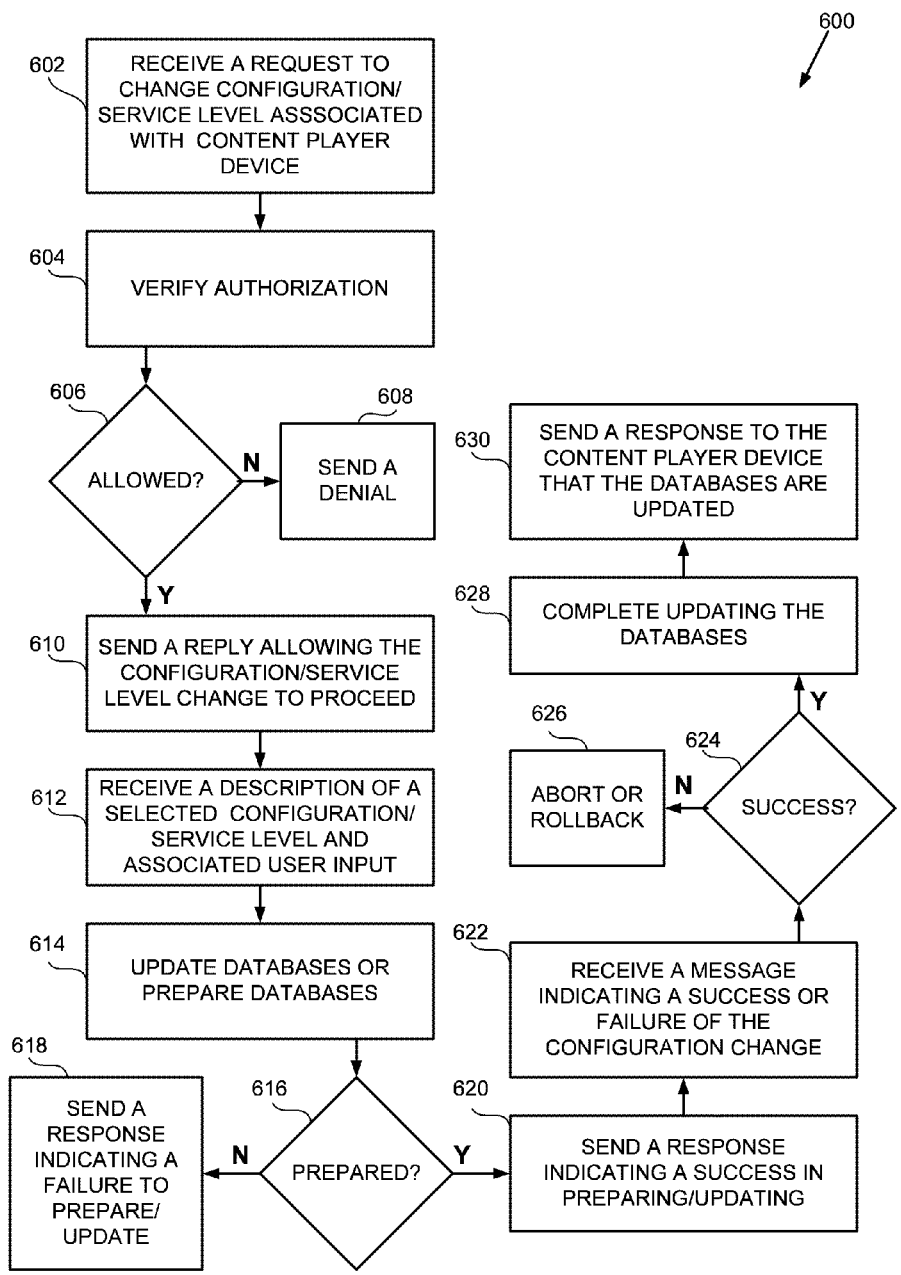
FIG. 6 is a flow diagram of an exemplary process that is associated with provisioning logic of the provisioning device of FIG. 4.

FIG. 6 is a flow diagram of an exemplary process 600 that is associated with provisioning logic 402. Assume that provisioning logic 402 is running on provisioning device 114. Process 600 may start with provisioning logic 402 receiving a request to change configuration/service level of content player device 102 (block 602). The request may include a user identification (e.g., user account information), authentication information (e.g., a user identifier, password, etc.), etc.

Provisioning logic 402 may verify whether the user at content player device 102 is authorized to change the configuration/service level associated with content player device 102 (block 604). To verify the user authorization, provisioning logic 402 may perform a lookup in customer database 404 to ensure that its business logic does not prevent the user from modifying the configuration/service level. If the user is not allowed to change the configuration/service level (block 606—NO), provisioning logic 402 may send a denial to content player device 102 (block 608).

If the user is authorized, provisioning logic 402 may send a reply allowing the configuration/service level change to proceed (block 610). In one implementation, to send the reply, provisioning logic 402 may perform a lookup of content player device database 406 and determine content player device 102's current setting, as well as possible configurations/service levels that the user may select. Further, provisioning logic 402 may include the information obtained from its lookup in the reply. Consequently, the reply may include sufficient information for content player device 102 to create a menu or a window in which the user is presented with a list of selectable configurations/service levels.

Provisioning logic 402 may receive a description of a configuration/service level that is selected by the user at content player device 102 and user input that is associated with the selection (block 612). For example, provisioning logic 402 may receive from content player device 102 a description of a configuration in which the upper limit of usable storage space is 100 Gb.

Provisioning logic 402 may update its databases or prepare the databases (block 614). Continuing with the previous example, provisioning logic 402 may request content player device database 406 to prepare to change its record of the upper limit of the usable storage space on content player device 102. In another example, provisioning logic 402 may obtain a list of movies from content player device 102 (e.g., from the description received at block 612) and commit to storing the list into user content index database 408. In this case, if the configuration change does not complete due to a disk failure or an unexpected event, the user may re-download content that is in the list from user content index database 408. In still another example, if the user selects a configuration in which the usable disk storage space is decreased, and the user later attempts to swap out one movie for another that the user deleted during the configuration change (e.g., due to space limitation), provisioning logic 402 (or another logic) may use user content index database 408 to verify that the movie the user wants to swap in is in the list.

If provisioning logic 402 fails to prepare or an update a database (block 616—NO), provisioning logic 402 may send a response to content player device 102, indicating its failure to prepare and/or update the database (e.g., a write failure) (block 618). Otherwise (block 616—YES), provisioning logic 402 may send a response to content player device 102 indicating that its databases are prepared/updated, and that content player device 102 may proceed with the configuration/service level change (block 620)

Provisioning logic 402 may receive a message indicating a success or a failure of the configuration change from content player device 102 (block 622). If the message indicates that the configuration change is a failure (block 624—NO), provisioning logic 402 may abort the database writes and/or rollback the database updates (block 626). For example, assume that content player device database 406 is prepared to record a change in the upper limit of usable disk storage at content player device 102. If the message indicates that content player device 102 has failed in its attempt to reconfigure its usable disk space, customer database 404 may abort changing the record.

If the message indicates that the configuration change is a success (block 624—YES), provisioning logic 402 may commit the updates to its databases (block 628). For example, again assume that the content player device database 404 is prepared to record the change in the upper limit of usable disk storage at content player device 102. In such a case, provisioning logic 402 may cause content player device database 406 to commit the change in the upper limit to the record. In another example, provisioning logic 402 may commit any changes in the service level, which is associated with the configuration change, to customer database 404. In some implementations, the changes in service level may result in a corresponding change in the billing rate or to charge the user. For example, if the configuration change results in an increase in the upper limit of usable storage space, the service level may be changed accordingly and may lead to an increased monthly billing rate associated with use of content player device 102.

Once provisioning logic 402 updates the databases, provisioning logic 402 may send a response to content player device 102 that the databases are updated, and that content player device 102 may display via content presentation device 106, to the user, that the configuration/service level change is complete (block 630).

In implementing process 600 shown in FIG. 6, provisioning logic 402 may use additional databases and/or mechanisms for bookkeeping purposes. For example, upon receiving a request for a configuration change at block 602, provisioning logic 402 may create an order ticket and/or a record that tracks progress of process 600. Upon completion, abortion, or rollback of the configuration/service level change (e.g., at blocks 608, 618, 626, and 630), provisioning logic 402 may delete the order ticket.

Figure 7:
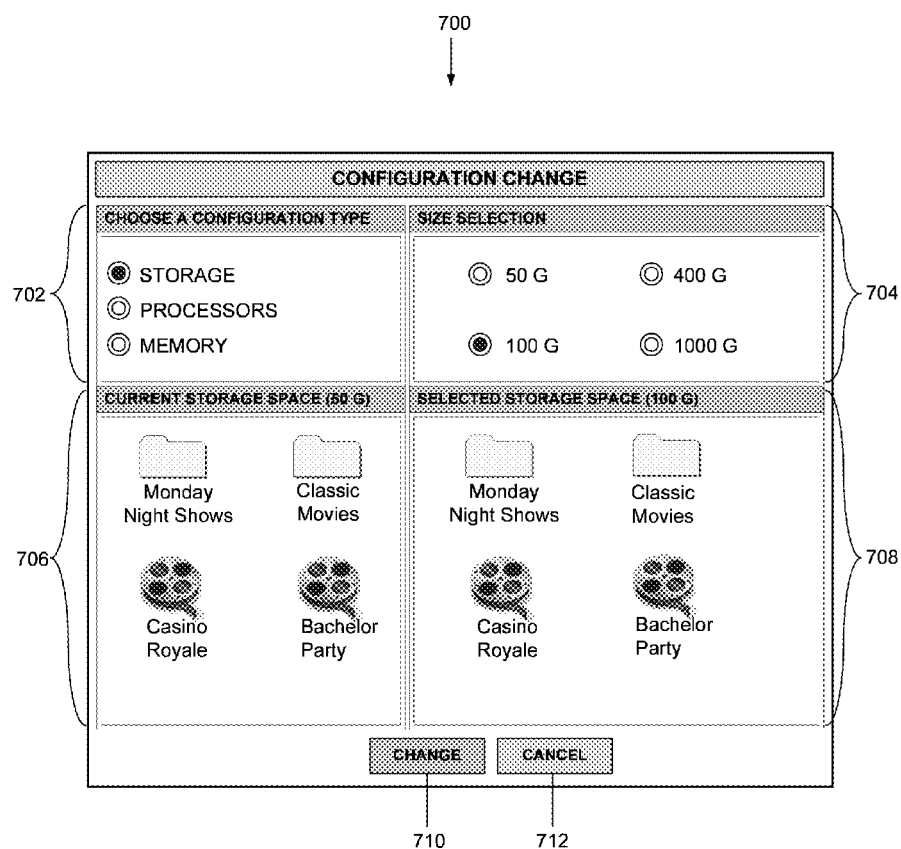
FIG. 7 shows an exemplary graphical user interface (GUI) window of the device configuration application of FIG. 3.

FIG. 7 shows an exemplary graphical a GUI window 700 of device configuration application 304. In one implementation, device configuration application 304 may display GUI window 700 at block 512 (FIG. 5). As shown, GUI window 700 may include a configuration type selection pane 702, parameter/size selection pane 704, current storage space pane 706, selected storage space pane 708, change button 710, and cancel button 712. Depending on the implementation, GUI window may include additional, fewer, or different components than those illustrated in FIG. 7.

Configuration type selection pane 702 may allow the user to select and modify an aspect of configuration that is associated with content player device 102. For example, in FIG. 7, configuration type selection pane 702 shows three options, "storage," "processors," and "memory." The user may change, for example, configuration parameters that are associated with storage space by selecting "storage."

Parameter/size selection pane 704 may allow the user to input and/or select parameters that are associated with the configuration type selected in configuration type selection pane 702. For example, in FIG. 7, parameter/size selection pane 704 includes a selectable list of different upper limits on usable disk space. In a different implementation, the user may type in a specific number within a given range into an input text box.

Current storage space pane 706 may show a list of content or groups of content that are currently stored on content player device 102. For example, in FIG. 7, current storage space 706 includes a "Monday Night Shows" folder, which may include shows broadcast on Monday; a "Classic Movies" folder," which may be a collection of classic movies; and movies "Casino Royale" and "Bachelor Party." Selected storage space pane 708 may show a list of content or groups of content that the user wants content player device 102 to include after the configuration change.

When the user increases the usable storage space via a configuration change, every item in the current storage space pane 706 may be included in selected storage space pane 708. For example, in FIG. 7, selected storage space pane 708 and current storage space pane 706 include the same items. When the user decreases the usable storage space (e.g., via a service level downgrade), however, the decreased storage space may be unable to store all of the items shown in current storage space pane 706. In such an instance, the user may place, in selected storage space pane 708, items that content player device 102 is to retain after the configuration change.

Change button 710 may cause device configuration application 304 to send a description of user selections that are shown in GUI window 700. The description may indicate, for example, that the user has selected a new disk space of 100 Gb, and that the user has selected "Classic Movies" folder and movie "Casino Royale" to be preserved in the new disk space (see block 518).

Cancel button 712 may cause device configuration application 304 to terminate. When device configuration application 304 terminates, device configuration application 304 may send a message to provisioning logic 402 that content player device 102 is aborting its process for changing configuration/service level. Although not illustrated in FIG. 6, in response, provisioning logic 402 may abort and/or rollback any pending database updates.

In the foregoing description, a system may provision a change in configuration of content player device 102. When a user wishes to change the configuration of content player device 102, the user may launch, on the content player device 102, device configuration application 304. Via device configuration application 304, the user may dispatch a network request to provisioning device 114 for a permission to change the configuration. When provisioning device 114 receives the request, provisioning device 114 may examine and/or modify database records that are associated with the user and/or content player device 102, and interact with content player device 102 to modify the configuration.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. Thus, modifications and variations are possible in light of the above teachings or may be acquired from practice of the teachings.

For example, in different implementations, processes 500 and 600 may omit blocks that are associated with preparing databases (e.g., blocks 520-524 and blocks 614-620). In each case, upgrades or other changes to content player device 102 may be accomplished quickly with little or no disruption for the user. In other implementations, device 102 may make changes without sending a request to change configuration/service level provisioning device 114. In such cases, content player device 102 may inform provisioning device 114 after a change is made, for billing and other purposes.

In another example, in some implementations, when device configuration application 304 is implemented in the form of a browser, device configuration application 304 may be included or installed on a remote device. In such implementations, the user may configure content player device 102 (e.g., increase its usable storage space) from the remote device via device configuration application 304. Further, content player device 102 may include components that communicate with and allow device control application 304 to modify the configuration of content player device 102.

Further, while series of blocks have been described with regard to exemplary processes illustrated in FIGS. 5 and 6, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, processing logic, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:
1. A set-top box device comprising:
a random access memory;

a network interface for communicating with another device over a network;
a storage unit to store content; and
a processor, to:
receive the content, over the network, from a content server device,
store the content on the storage unit,
receive a request from a user to change to a new service level agreement that specifies values for a usable amount of the random access memory, a speed of the processor, or a total amount of usable storage space, for the set-top box device, on the storage unit that includes the content stored via the processor,
send, from the set-top box device over the network to a service provider device, a message that describes the request to change to the new service level agreement, wherein the service provider device determines, in response to the message, whether the user is authorized to change to the new service level agreement,
receive, from the service provider device over the network at the set-top box device, a denial that prohibits the user from changing to the new service level agreement when the service provider device determines that the user is not authorized,
receive, from the service provider device over the network at the set-top box device, a reply allowing the user to change to the new service level agreement when the service provider determines that the user is authorized,
provide at least one option to the user, in response to the reply allowing the user to change to the new service level agreement, the at least one option including an option to select content that will be retained by the set-top box device when the total amount of usable storage space for the set-top box device is decreased in accordance with the new service level agreement,
receive information from the user selecting a first one of the at least one option,
send the information received from the user and a list of the content to the provisioning device,
attempt to set the total usable amount of the random access memory, the speed of the processor, or the total amount of usable storage space on the storage unit to the specified values in accordance with the new service level agreement, and
when the attempt is a failure to set the total amount of usable storage space, send a request to the provisioning device to:
restore the list, and
re-download the content on the list from the content server device,
wherein the service provider device is a different device than the set-top box device.

2. The set-top box device of claim 1, wherein the processor is further configured to:
prevent an amount of used storage space on the storage unit from exceeding one of the specified values.

3. The set-top box device of claim 1, wherein the processor is further configured to:
display a message on a presentation device to indicate that the total amount of usable storage space has changed.

4. The set-top box device of claim 1, wherein the reply includes:
a list of selectable sizes for the total amount of usable storage space.

5. The set-top box device of claim 1, wherein when the processor decreases the usable storage space, the processor is further configured to:
retain content corresponding to a selected list of content on the usable storage space.

6. The set-top box device of claim 5, wherein when the processor decreases the usable storage space, the processor is further configured to:
display a list of recorded programs.

7. A method comprising:
receiving, by a provisioning device, a request sent from a content player device of a user over a network to change to a new service level agreement that specifies upper limits on a speed of a processor or a total amount of usable storage space of a storage unit of the content player device that is configured to play multimedia content;
determining, by the provisioning device in response to the request, whether the user is authorized to change to the new service level agreement;
sending, by the provisioning device to the content player device, a denial that prohibits the user from changing to the new service level agreement when the provisioning device determines that the user is not authorized;
sending, by the provisioning device to the content player device, a reply allowing the user to change to the new service level agreement when the provisioning device determines that the user is authorized;
receiving, by the provisioning device and from the content player device in response to the reply allowing the user to change to the new service level agreement, a list of content stored at the content player device and a description of a selected configuration associated with the new service level agreement;
receiving, by the provisioning device and from the content player device, information indicating whether the content player device has set the upper limits on the speed of the processor of the content player device or the total amount of usable storage space of the content player device in have been changed in accordance with the new service level agreement;
storing, by the provisioning device, information associated with the selected configuration when the upper limits on the speed of the processor or the total amount of usable storage space of the content player device have been changed in accordance with the new service level agreement, and
restoring the list to the content player device, to allow the content player device to re-download the content on the list from a content server device over the network when the received information indicates that the content player device has not set the total amount of usable storage space of the content player device in accordance with the new service level agreement,
wherein the reply includes a list of selectable configuration changes,
wherein the provisioning device is a different device than the content player device.

8. The method of claim 7, further comprising:
performing a lookup of information associated with the content player device in a database; and
determining the list of selectable configuration changes based on the information.

9. The method of claim 7, further comprising:
sending a message, by the provisioning device to the content player device, wherein the message indicates that storing the information associated with the selected configuration has been completed.

10. The method of claim 7, further comprising:
authenticating the user in response to the request.

11. The method of claim 7, further comprising:
upgrading a service level in accordance with the new service level agreement.

12. The method of claim 7, wherein storing information includes:
recording the selected configuration in a database associated with a plurality of content player devices.

13. The method of claim 7, further comprising:
rolling back or aborting updates to a database when the received information indicates that the content player device has not set the upper limits on the speed of the processor of the content player device or the total amount of usable storage space of the content player device in accordance with the new service level agreement.

14. A non-transitory computer-readable storage medium including computer-executable instructions, the computer-executable instructions comprising:
instructions for receiving content, from a content server device over a network, by a content player device;
instructions for requesting by the content player device that plays multimedia content, from a provisioning device, over the network, to change to a new service level agreement that specifies a value of a total usable amount of storage space of the content player device, wherein the provisioning device determines, in response to the request, whether a user of the content player device is authorized to change to the new service level agreement;
instructions for receiving, by the content player device and from the provisioning device, a denial that prohibits the user from changing to the new service level agreement when the provisioning device determines that the user is not authorized;
instructions for receiving, by the content play device and from the provisioning device, a reply allowing the user to change to the new service level agreement when the provisioning device determines that the user is authorized;
instructions for providing to the user, by the content player device in response to the reply allowing the user to change to the new service level agreement, an option for selecting a configuration among a plurality of configurations associated with the new service level agreement;
instructions for selecting, by the content player device in response to user input, a configuration among the plurality of selectable configurations provided to the user;
instructions for sending information indicating the selection and a list of the content to the provisioning device,
instructions for attempting, by the content player device, a configuration change in the content player device in accordance with the selected configuration, wherein the configuration change is associated with setting the total usable amount of the storage space to the specified value;
instructions for sending, by the content player device to the provisioning device, a message that indicates a result of the attempt at the configuration change;
instructions for sending a second request, when the attempt is a failure to set the total amount of usable storage space, by the content player device and to the provisioning device, to;
restore the list at the content player device, and
re-download, by the content player device, the content on the list from the content server device,
wherein the provisioning device is a different device than the content player device.

15. The non-transitory computer-readable storage medium of claim 14, further comprising:
instructions for sending an authentication request to the provisioning device prior to performing the configuration change, wherein the authentication request includes information for user authentication.

16. The non-transitory computer-readable storage medium of claim 14, wherein the content player device includes one of a set-top box, computer, or television.

17. The non-transitory computer-readable storage medium of claim 14, wherein the instructions for performing a configuration change include at least one of:
instructions for increasing a configuration parameter; or
instructions for decreasing a configuration parameter.

18. A system comprising:
a content player device, to:
download content from a content server device;
receive a user selection from the content;
prompt, in response to the user selection, the user with a message indicating that a speed of a processor or a total amount of usable storage space of the content player device needs to be increased for improved performance and inquiring whether the user would like to upgrade a service level agreement to increase the speed of a processor or the total amount of usable storage space of the content player device;
send a request to a provisioning device to upgrade the service level agreement;
select a speed of the processor or a total amount of usable storage space based on user input when the content player device receives a reply, from the provisioning device, that grants the request;
send a list of the content and information indicating the selected speed of the processor or the selected total amount of usable storage to the provisioning device;
attempt to set the speed of the processor or the total amount of usable storage space of the content player device to the selected speed or the selected total amount of usable storage space;
send a message indicating a result of the attempt to the provisioning device; and
when the attempt is a failure to set the total amount of usable storage space, send a second request to the provisioning device to:
restore the list, and
re-download the content on the list from the content server device, and
the provisioning device to:
receive the request from the content player device;
in response to the request, determine whether the user is authorized to upgrade the service level agreement based on the request;
when the provisioning device determines that the user is authorized, send to the content player device the reply that grants the request;
receive the list of the content and an identification of the selected speed or the selected total amount of usable storage space from the content player device; and
store the selected speed of the processor or the total amount of usable storage space for the content player device when the message indicates a successful change to the speed of the processor or the total amount of usable storage space, wherein the provisioning device is a different device than the content player device.

19. The system of claim 18, wherein the content player device includes one of a set-top box, computer, or television.

20. The system of claim 18, wherein when the content player device attempts to set the speed of the processor or the total amount of usable storage space, the content player device is to:
increase a value of a configuration parameter; or
decrease a value of a configuration parameter.

* * * * *